Jan. 6, 1931.　　　M. DWORK　　　1,788,283
TIRE PULLING DEVICE
Filed Feb. 27, 1930
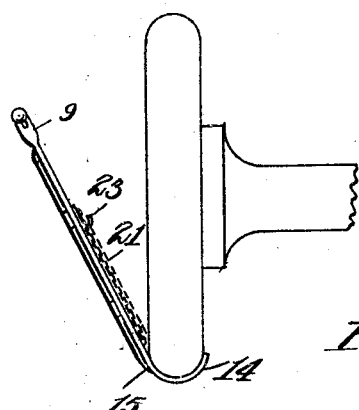
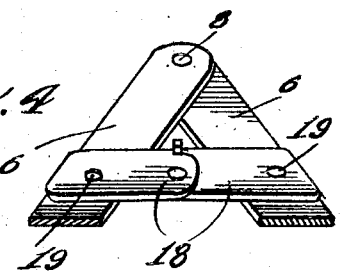
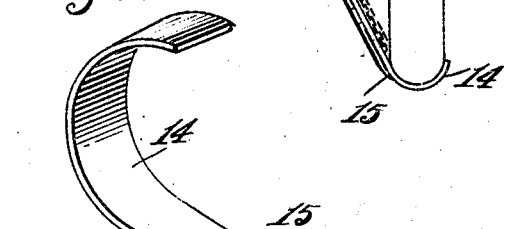
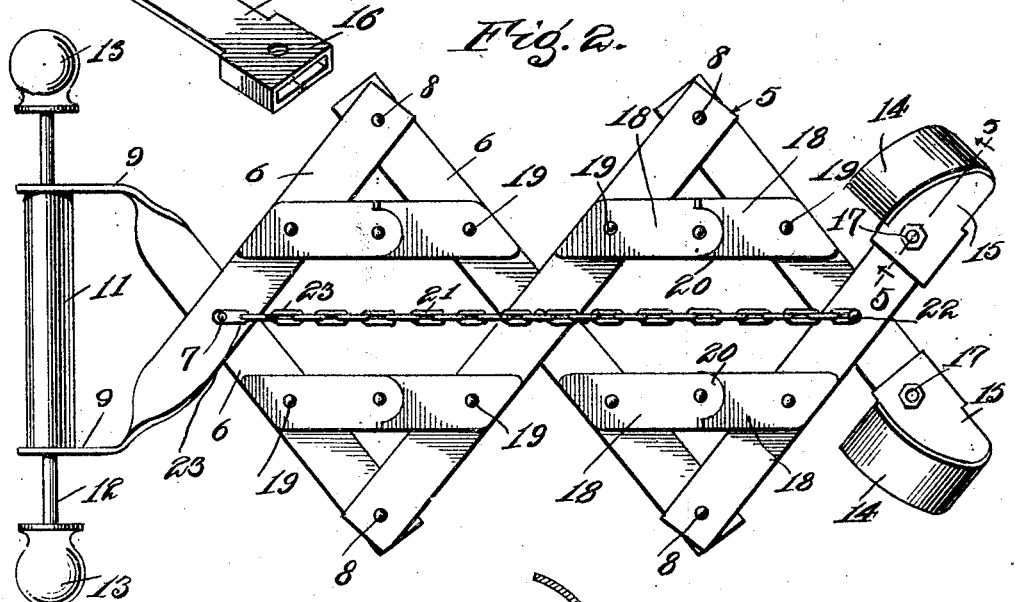
WITNESS
F. H. Taylor
INVENTOR
Max Dwork.
BY
ATTORNEYS Patented Jan. 6, 1931

1,788,283

UNITED STATES PATENT OFFICE

MAX DWORK, OF BROOKLYN, NEW YORK

TIRE-PULLING DEVICE

Application filed February 27, 1930. Serial No. 431,874.

My invention relates to tire pulling devices and more particularly to a hand tool for pulling a pneumatic tire from the wheel or the wheel from the axle.

An object of the present invention is to provide a hand tool of this character which is collapsible so that it can be carried in a comparatively small space and which may be quickly extended for use.

A further object of the invention is to provide a collapsible tool of this character embodying a lazy tong lever having means associated therewith whereby strain incident to the wheel or tire pulling operation is not transmitted to any of the pivot connections of the elements embodying the lazy tong lever.

Further the invention contemplates a collapsible hand tool whereby the lazy tong lever is rigidly held in extended position when in use.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is an elevation of the device engaged with a pneumatic tire;

Fig. 2 is a plan view of the device in extended position;

Fig. 3 is a perspective of one of the hook members embodied in the invention;

Fig. 4 is a fragmentary perspective and

Fig. 5 is a longitudinal section taken on line 5—5 of Fig. 2.

Referring to the invention in detail a lazy tong lever 5 is provided comprising pairs of crossed links 6, each pair of which is pivotally connected intermediate their ends as at 7 while their extremities are pivotally connected together as at 8.

The extremities of the link 6 at the inner end of the lazy tong are bent to provide parallel extensions 9, the latter having coinciding longitudinal slots 10. Arranged between the extensions 9 is a tubular hand grip 11. A rod 12 extends centrally through the hand grip 11 and projects through the slots 9.

Each end of the rod 12 has a head or stop 13 attached thereto which limits the movement of the extensions 9 in one direction and to limit the longitudinal movement of the rod relative to the extensions.

A hook element 14 is provided for each terminal of the end links at the outer end of the lazy tong lever. Each of the hook elements 14 is formed with a relatively flat shank 15 having a rectangular shape in cross section sleeve 16 formed on its under face. The sleeve 16 is received on one of the terminals of these links 6 and is secured thereto by a bolt or other suitable fastening 17. As disclosed in Fig. 2 the hooks 14 are disposed in divergent relation so that they will properly embrace the tire.

In order to hold the lazy tong lever against collapsing when extended pairs of cooperating links 18 are pivotally connected with the links 6 of the lazy tong lever as at 19. The links 18 are located upon opposite sides of the pivot points 7 and the pivots 19 of the links at each side of the pivot points 17 are located in longitudinal alinement.

Thus when the device is extended the links on each side of the pivots 7 will be disposed in longitudinal alinement. The adjacent ends of each pair of links 18 are connected by pivotal lock joints 20 so that the lazy tong lever will be held in extended position until the lock joint of each pair of links is broken.

For the purpose of relieving the pivot points the links 6 and 18 from strain when a pull is exerted on the device a chain or other flexible element 21 is provided. One end of the chain or flexible element 21 is anchored to the pivot point 7 at the outer end of the lazy tong lever as indicated at 22 while its opposite end is detachably engaged with a hook element 23 attached to the lazy tong at the pivot point 7 at the inner end of the latter. With the lazy tong in extended position the chain 21 is placed under tension and extends longitudinally of the longitudinal center of the lazy tong.

In the operation of the device it is engaged with the pneumatic tire as disclosed in Fig. 1. Upon exerting an outward pull the tire and its rim will be dislodged from the wheel where it can be readily lifted off. Should it be necessary to remove the wheel at any time the device can also be used for this purpose.

From the disclosure it will be manifest that I have provided a simple and efficient tool which can be readily collapsed and stored in a small space in the automobile. Moreover when the tool is extended the parts remain rigid so that it cannot prematurely collapse. It will also be seen that by the provision of the chain 21 substantially all of the pull will be taken up by the latter so that strain on the various pivotal connections is eliminated.

By reason of the detachability of the hook elements either one of the same may be replaced by a new one in the event of breakage.

What is claimed is:

1. In a pulling tool, a lazy tong lever, a handle attached to one end thereof and object engaging elements attached to the opposite end thereof, and means for holding the elements of the lazy tong lever from collapsing when extended for use.

2. In a pulling tool, a lazy tong lever, a handle attached to one end thereof and object engaging elements attached to the opposite end thereof, and pairs of links pivotally connected with the links of the lazy tong lever and each pair having a lock joint so that the lazy tong will be held against collapsing when extended for use.

3. In a pulling tool, a lazy tong lever, a handle attached to one end thereof, a pair of links pivotally connected with the links of the lazy tong lever and each link having a lock joint so that the lazy tong will be held against collapsing when extended for use, the links at one end of the lazy tong having free ends, and a hook element carried by each free end.

4. In a collapsible tool, a lazy tong lever having its links arranged in crossed relation and pivotally connected together at their points of crossing and having their terminals pivotally connected with the terminals of adjacent links, a handle carried by the ends of one pair of links, hook elements carried by the ends of a second pair of links and a flexible element secured to the links and adapted to be placed under tension when the lazy tong is extended and receive the pull exerted thereon when the device is placed under strain and thereby relieve the pivot points of strain.

5. In a collapsible tool, a lazy tong lever having its links arranged in crossed relation and pivotally connected together at their points of crossing and having their terminals pivotally connected with the terminals of adjacent links, a handle carried by the ends of one pair of links, hook elements carried by the ends of a second pair of links, and a flexible element secured to the links and adapted to be placed under tension when the lazy tong is extended to receive the pull exerted thereon when the device is placed under strain and thereby relieve the pivot points of strain, and cooperating pairs of links secured to the movable parts of the lazy tong and each pair having a lock joint so that the lazy tong will be held against accidental collapsing after it has been extended.

6. In a collapsible tire or wheel puller, a lazy tong lever having engaging means at one end, the links of the lazy tong at the opposite end being provided with extensions, a tubular handle arranged between the extensions, a rod extending through the handle and extensions, and a head on each end of the rod and spaced from the adjacent extensions.

MAX DWORK.